Patented Mar. 12, 1940

2,193,557

UNITED STATES PATENT OFFICE 2,193,557

DYESTUFF INTERMEDIATE

Arthur Ernest Everest and James Arthur Wallwork, Huddersfield, England, assignors to John W. Leitch & Company, Limited, Huddersfield, England, a British company No Drawing. Application July 2, 1938, Serial No. 217,304. In Great Britain July 2, 1937

4 Claims. (Cl. 8—46)

This invention relates to the production of preparations containing arylamides of β-hydroxynaphthoic acid and/or aceto-acetic arylides. In our co-pending application Serial No. 147,260 a water soluble powder is claimed comprising one or more arylamides of β-hydroxynaphthoic acid or one or more aceto-acetic arylides, one or more powdered or finely crystalline alkaline-reacting salts stable on storage and sufficiently alkaline to dissolve the aforesaid arylamide or arylamides or the aforesaid arylide or arylides and one or more wetting or dispersing agents capable of being prepared in powder form.

We have now found that when sodium metasilicate is used as the alkaline-reacting salt in the powders claimed in our co-pending application Serial No. 147,260 either alone or with small additions of other alkaline-reacting salts such as soda ash or tri-sodium phosphate, it is possible to dispense with the wetting or dispersing agent.

Accordingly the present invention provides a powder comprising one or more arylamides of β-hydroxynaphthoic acid and/or one or more aceto-acetic arylides and sodium metasilicate or mixtures of sodium metasilicate and small proportions of other alkaline-reacting salts such as soda ash or tri-sodium phosphate.

The invention also includes a dyebath comprising an aqueous solution of one or more arylamides of β-hydroxynaphthoic acid and/or one or more aceto-acetic arylides and sodium metasilicate or sodium metasilicate and small proportions of other alkaline-reacting salts such as soda ash or tri-sodium phosphate.

The following are examples illustrating preparations according to the invention:

|   | Pounds |
|---|---|
| 1. Brenthol MN powder | 10 |
| Sodium metasilicate in powder or finely crystalline form | 20 |
|   | 30 |

The ingredients are intimately mixed in a horizontal mixing drum or by any other suitable means until a uniform mixture is produced.

|   | Pounds |
|---|---|
| 2. Brenthol OT powder | 10 |
| Sodium metasilicate in powder or finely crystalline form | 30 |
|   | 40 |

The mixing is effected as in Example 1.

|   | Pounds |
|---|---|
| 3. Brenthol AT powder | 10 |
| Tri-sodium phosphate in powder or finely crystalline form | 10 |
| Sodium metasilicate in powder or finely crystalline form | 40 |
|   | 60 |

The mixing is effected as in Example 1.

|   | Pounds |
|---|---|
| 4. Brenthol OT powder | 10 |
| Soda ash powder | 10 |
| Sodium metasilicate in powder or finely crystalline form | 30 |
|   | 50 |

The mixing is effected as in Example 1.

|   | Pounds |
|---|---|
| 5. Brenthol OT powder | 10 |
| Brenthol AT powder | 10 |
| Sodium metasilicate in powder or finely crystalline form | 80 |
|   | 100 |

The mixing is effected as in Example 1.

The word "Brenthol" is a registered trademark. Brenthol OT is equivalent in composition to Naphthol ASD whilst Brenthol AT is equivalent to Naphthol ASG.

What we claim is:

1. As a new composition of matter, a dry, stable, non-hygroscopic powder free from caustic alkali, the constituents of which are in themselves stable and non-reactive with each other in the dry powder state, said composition comprising a normally water-insoluble dyestuff unreacted with alkali selected from the group consisting of arylamides of β-hydroxy naphthoic acids and aceto-acetic arylides, and an alkaline reacting salt comprising sodium metasilicate for solubilizing said dyestuff when the composition is admixed with water, said constituents being so proportioned that upon addition of the composition to water, the water insoluble dyestuff dissolves.

2. As a new composition of matter, a dry, stable, non-hygroscopic powder free from caustic alkali, the constituents of which are in themselves stable and non-reactive with each other in the dry powder state, said composition comprising a normally water-insoluble dyestuff unreacted with alkali selected from the group consisting of arylamides of β-hydroxy naphthoic acids and aceto-acetic arylides, and an alkaline reacting salt comprising sodium metasilicate and another alkaline salt for solubilizing said dyestuff when the composition is admixed with water, said constituents being so proportioned that upon addition of the composition to water, the water-insoluble dyestuff dissolves.

3. A composition of matter as claimed in claim 2 in which the other alkaline reacting salt is soda ash.

4. A composition of matter as claimed in claim 2 in which the other alkaline reacting salt is trisodium phosphate.

ARTHUR ERNEST EVEREST.
JAMES ARTHUR WALLWORK.